Feb. 25, 1969   C. F. MARTIN   3,429,131
PIPELINE TRENCHING APPARATUS
Filed March 22, 1967   3 Sheets-Sheet 3
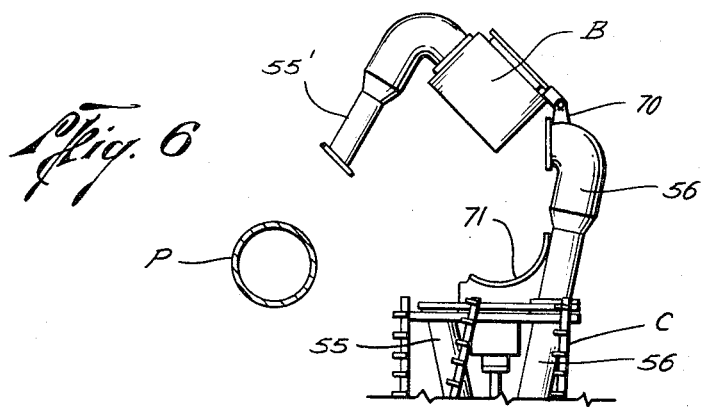
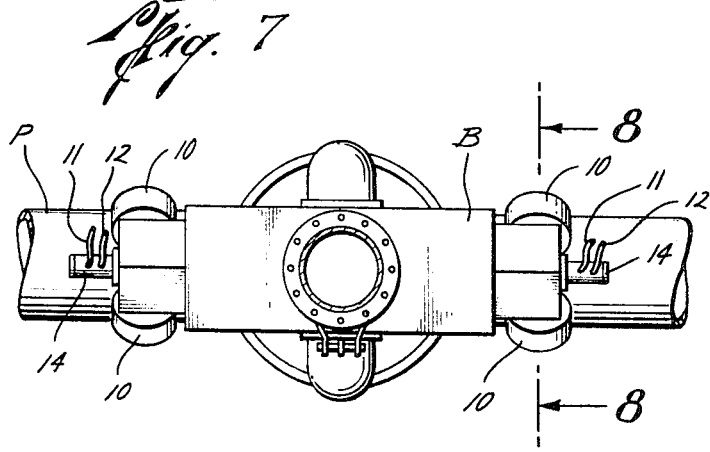
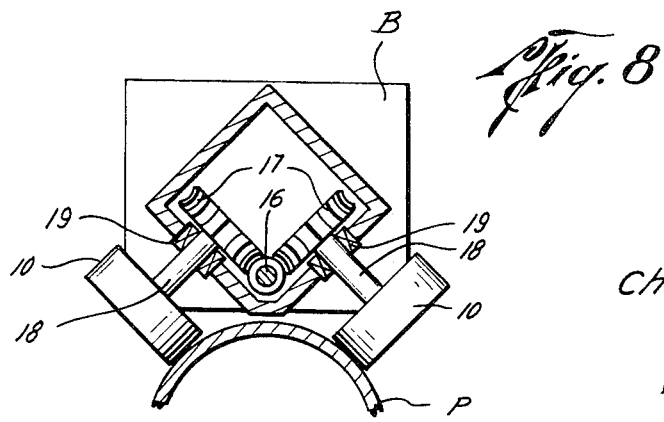
Charles F. Martin
INVENTOR.
BY Hayden & Pravel
ATTORNEYS

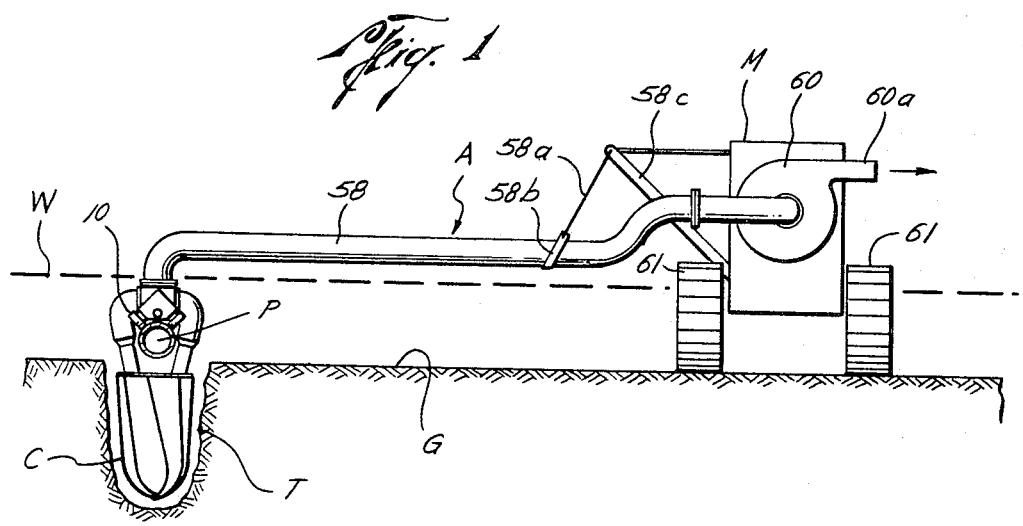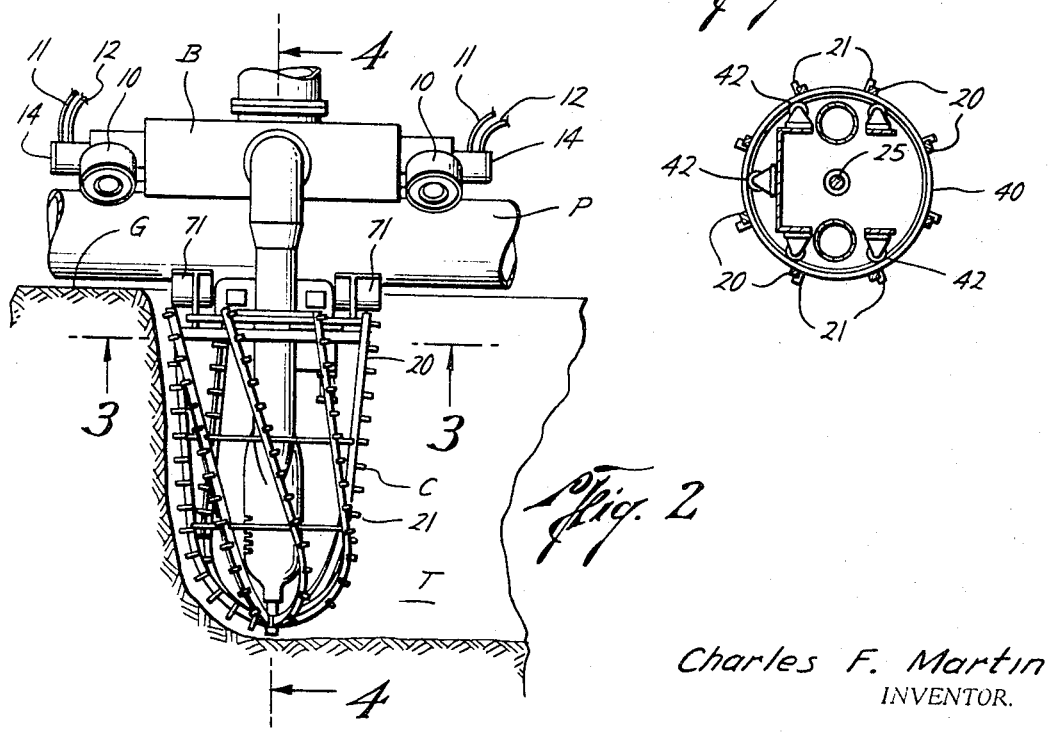

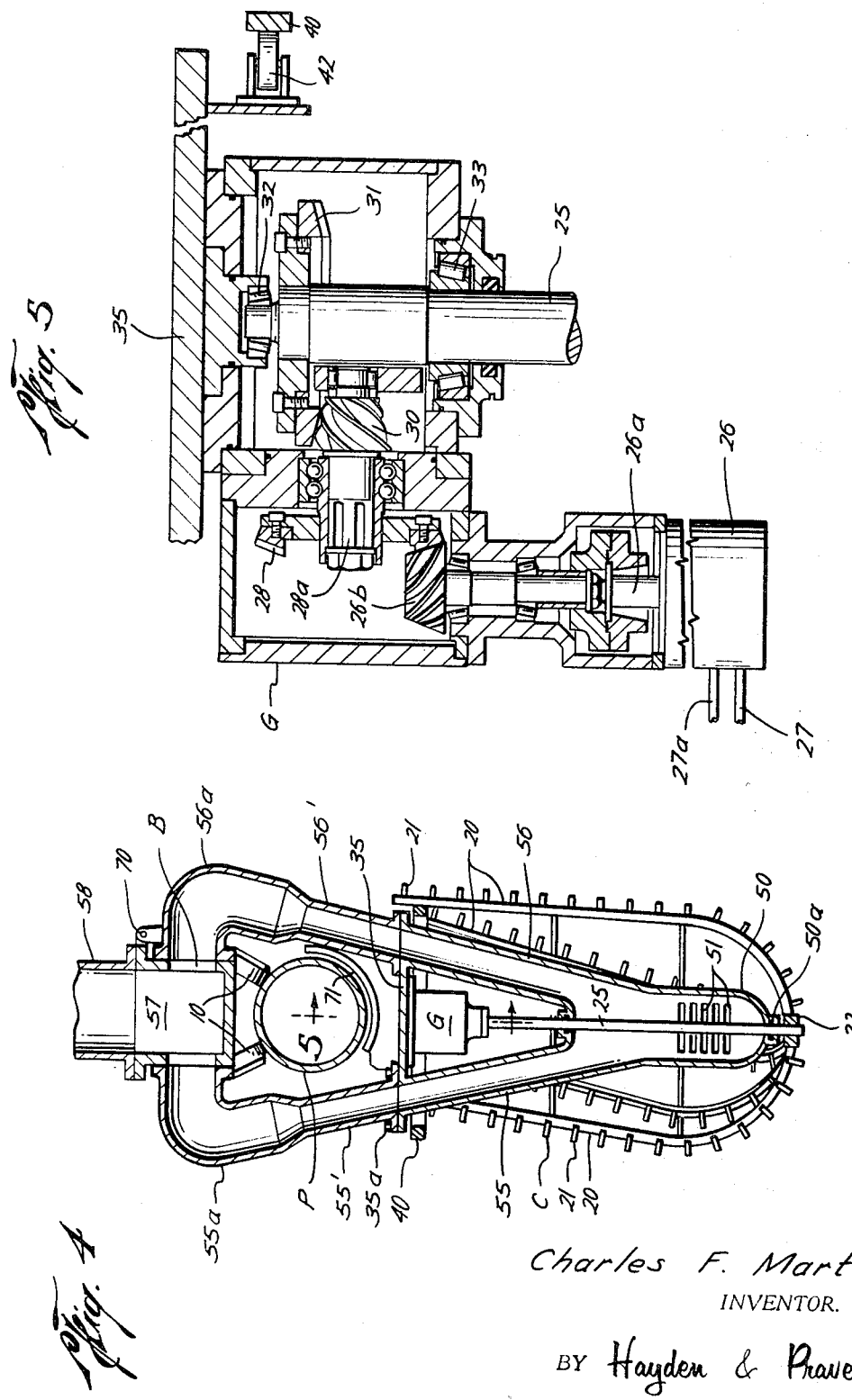

United States Patent Office 3,429,131
Patented Feb. 25, 1969

3,429,131
PIPELINE TRENCHING APPARATUS
Charles F. Martin, 3515 Bluebonnet,
Houston, Tex. 77025
Filed Mar. 22, 1967, Ser. No. 625,201
U.S. Cl. 61—72.4                    10 Claims
Int. Cl. E02f 5/02

ABSTRACT OF THE DISCLOSURE

A trenching apparatus for travel on a pipeline and having a substantially vertical cutter removably mounted below the pipeline to dig a single trench therebelow and into which the pipeline subsequently is positioned.

Background of the invention

The field of the invention is trenching apparatus for cutting a trench below a pipeline with a rotary cutter while the pipeline is located above the trench being cut. In the past, jetting types of trenching machines have been developed, an example of which is shown in U.S. Patent No. 2,879,649. Such jetting machines are of limited value since their use is generally confined to soft sandy soils. Trenching machines having horizontal cutters, such as illustrated in U.S. Patents Nos. 2,765,548 and 3,004,392 have also been attempted but have not been satisfactory, either because of their bulk or their inability to cut a single trench, or for other reasons.

Summary of the invention

The present invention is a trenching apparatus which is relatively simple in construction, and which is capable of cutting a single trench directly below a pipeline, in hard and soft soils alike. Such apparatus has a substantially vertical rotary cutter which is operated by a fluid-driven motor and which is provided with means for causing the apparatus to travel on the pipeline for which the trench is being cut.

An object of the present invention is to provide a new and improved pipeline trenching apparatus for travel on the pipeline and for cutting a single trench therebelow in hard and soft soils.

Other objects will be evident from the description, drawings, and claims hereof.

Brief description of the drawing

FIG. 1 is an elevation, partly in section, of the apparatus of the present invention as it is preferably used for digging a trench below a pipeline;

FIG. 2 is a side view of the apparatus of this invention as it is cutting a trench below a pipeline;

FIG. 3 is a view taken on line 3—3 of FIG. 2 for illustrating details of the mounting of the upper end of the rotary cutter of the apparatus;

FIG. 4 is a vertical sectional view taken on line 4—4 of FIG. 2 and illustrates in detail the apparatus of this invention;

FIG. 5 is a sectional view taken on line 5—5 to illustrate the drive mechanism for the rotary cutter of the apparatus of this invention;

FIG. 6 is a partial view illustrating the apparatus of this invention in an open position for positioning on, or removal from, a pipeline;

FIG. 7 is a plan view of the apparatus of this invention, illustrating the support body and wheels on the pipeline; and FIG. 8 is a sectional view taken on line 8—8 of FIG. 7 to illustrate one form of driving mechanism for moving the apparatus of this invention along a pipeline.

Description of the preferred embodiments

In the drawings, the letter A designates generally the apparatus of this invention, which is adapted to be used for cutting a trench or ditch T below a pipeline P. Although the apparatus A may be used in shallow water or in other areas away from water, the apparatus A is illustrated as being used in shallow water W which has a bottom or soil level G. As will be more fully explained, the pipeline P is previously positioned on the ground or bottom G prior to positioning the apparatus A thereon. After an initial hole is provided below the pipeline P at one point, the apparatus A is adapted to be positioned thereon, with the cutting assembly below the pipeline P, and thereafter the operation of the apparatus A forms the trench or ditch T below the pipeline P into which the pipeline P is adapted to be positioned.

Considering the invention more in detail, the apparatus A includes an upper support body B which has a plurality of support wheels 10 rotatably mounted thereon for engaging the upper surface of the pipe P. The support wheels 10 may be mounted in numerous ways, but as particularly illustrated in FIGS. 2, 7, and 8, there are preferably a set of forward wheels 10 and and a set of rearward wheels 10, at least one of which is driven. In the preferred embodiment, as particularly illustrated in FIGS. 2, 7, and 8, both sets of wheels 10 are driven by hydraulic or other fluids supplied through fluid lines 11 and returned through fluid lines 12 relative to any suitable source of fluid pressure. The fluid is supplied to a fluid driven motor 14 of conventional design mounted on the ends of the support body B for driving a worm gear 16 (FIG. 8) which meshes with gears 17 on the ends of wheels axles 18. The axles 18 are supported in thrust bearings 19 or any other suitable bearing support.

A rotary cutter C is disposed below the pipeline P and is mounted for rotation with respect to the support body B, as will be more fully explained. The rotary cutter C is formed, in its preferred embodiment, as a cage with a plurality of cage frame bars or members 20, each of which has a plurality of cutter elements or teeth 21 welded or otherwise affixed thereto. Preferably, such cage frame members 20 are spirally disposed (FIG. 2) and are rotated in a direction so that the cutter elements 21 on the lower portion of each frame member 20 engage the uncut soil first. The spiraling of the members 20 tends to avoid initial full contact with the soil and eliminates charter or vibration which might otherwise be present. The cutter C may be rotated in either direction, but as stated above, it is preferred to rotate it in a counterclockwise direction as viewed in FIG. 3 when the members 20 are spiraled in the direction shown in FIG. 2. Such cutter teeth or elements 21 may be carbide tipped or surfaced, or may be formed of other hard material suitable for cutting hard soils. Preferably, all of the cage frame bars or members 20 are welded or are otherwise affixed to a common hub 22 at the lower end.

The hub 22 is connected to the lower end of a drive shaft 25 is driven by a fluid actuated motor 26 which the rotary cutter C (FIGS. 4 and 5). As shown in detail in FIG. 5, the substantially vertically extending drive shaft 25 is driven by fluid actuated motor 26 which is supplied with fluid, such as hydraulic fluid, through an inlet line 27 and which returns such fluid to the fluid resource through a line 27a and the known manner. The motor 26 is connected to the shaft 25 through any suitable gearing assembly such as indicated at G in FIG. 5 and which specifically includes in the form therein illustrated a motor shaft 26a which is suitably connected for rotating a pinion gear 26b. The pinion gear 26b engages a ring gear 28 which is mounted on the shaft 28a and which has a pinion gear 30 on its other end. The pinion gear 30 meshes with a substantially horizontally disposed ring gear 31 which is suitably connected to the upper end of the shaft 25. The shaft 25 is mounted in bearings 32 and 33 or any other suitable bearing assembly so that it is supported from a support plate 35 which is directly connected to the support body B, as will be more evident hereinafter.

It is to be noted that the upper end of the cutter C has a circular guide ring or track 40, which is welded to the upper ends of each of the cage frame elements or bars 20 (FIGS. 3 and 4). The support plate 35 has welded or otherwise secured thereto a plurality of guide or stabilizing rollers 42, each of which is adapted to engage the inside of the guide ring or track 40 for stabilizing the cutter C as it is rotated by the drive shaft 25. One of the guide rollers 42 is shown in FIG. 5, while the remainder are illustrated in FIG. 3 in engagement with the guide ring 40.

For removing the soil which is cut by the rotary cutter C, a suction means is provided with the apparatus A. The suction means includes a lower tubular inlet pipe 50 which has a plurality of laterally extending slits or other openings 51 through which the soil or other cuttings may pass as they are pumped from the trench T. The shaft 25 passes through the lower portion of such tubular pipe 50 and a bearing 50a may be provided for the lower end of the shaft 25 if desired for stability of the shaft 25.

The suction inlet pipe 50 is in communication with a pair of flow tubes 55 and 56 which diverge in a Y shape as best seen in FIG. 4 and eventually through bends 55a and 56a, respectively, and communicate with the interior of the hollow body B. The body B has an internal opening or passage 57 which communicates with an upper tube 58 (FIGS. 1 and 4). The tube 58 perferably is a relatively long laterally extending tube or pipe which is connected with a conventional pump 60 mounted on a remote movable apparatus M which moves with the cutting portion of the apparatus A, as will be more fully explained. The pipe 58 may be supported at its mid portion by a support cable 58a, and a band 58b surrounding the pipe 58. Such cable 58a may extend over a support 58c from the movable unit M, or may be otherwise supported so that the discharge from the pump 60 is at a point remote from the actual cutting operation in the trench T. The discharge is indicated at 60a and, in some instances, it is desirable to have an additional hose or pipe extending back to the trench T at a point remote from the actual operation so as to fill the trench T after the pipeline P has been laid in the trench T.

The movable unit M may have caterpiller type wheels 61 to facilitate its movement on the bottom of a low water area such as indicated at G in FIG. 1 although other movable wheels or drive assemblies may be employed in some other circumstances. The movable unit M may have various power supplies and hydraulic or other fluid sources for supplying to the fluid driven motor 26 and the fluid driven motors 14. Thus, the hydraulic equipment for supplying the fluid pressure to the motors used with the cutting portion of the apparatus A may be disposed above the water level and at a point available for servicing when desired. A gasoline engine or other suitable prime mover may also be mounted with said unit for operating such equipment, including the pump 60, as will be well understood.

To properly position the cutting portion of the apparatus A at the pipeline P, the support body B is connected to the tube 56 by a hinge 70, which permits a relative pivotal movement between the body B and the rotary cutter C, as illustrated in FIG. 6. It is to be noted that the upper portion of the tube 55, indicated at 55′ is connected to the body B and is releasably attached to the plate 35 by one or more releasable attaching bolts 35a (FIG. 4) or any otther suiabtle releasable attaching means. When the bolts or other attaching means 35a are released from the plate 35, the support body B and the upper portion 55′ of the tube 55 are movable to the open position as indicated in FIG. 6 so as to provide a sufficient opening to permit a movement of the cutting portion of the apparatus A to or from the pipeline P.

To further stabilize the apparatus of this invention during the cutting operation, it is desirable to provide a pair of longitudinally spaced arcuate lower saddles 71 (FIGS. 2 and 4) each of which is disposed at a position closely below the pipeline P, although preferably not in contact therewith, to avoid any vertical jumping or upward movement of the apparatus during the cutting operation, should such apparatus encounter extremely hard ground or other obstruction which would tend to disrupt the normally smooth rotational movement of the cutter C.

From the foregoing description, it will be appreciated that the present apparatus is suitable for cutting a single trench below a pipeline which has previously been positioned on the ground G, whether such ground G is the bottom of a shallow body of water or is on the dry land. The substantially vertical rotary cutter C provides for maximum efficient cutting action immediately below the pipeline P, and it further provides for an automatic positioning of the cutter C directly below the pipeline P due to the effect of gravity thereon and its downward pull during cutting action. The center of gravity of the cutting portion of the apparatus A is below the pipeline P so that there is substantially no tendency for the cutter C to deviate from a straight line below the pipeline P. The single trench T which is thus cut by the rotary cutter C is of an adequate size for receiving the pipeline P and it is in proper alignment with such pipeline P so that the pipeline P remains substantially straight when it is laid in the trench T.

The foregoing disclosure and description of the invention are illustrative and explanatory thereof, and various changes in the size, shape, and materials as well as in the details of the illustrated construction may be made within the scope of the appended claims without departing from the spirit of the invention.

I claim

1. An apparatus for cutting a trench below a pipeline, comprising:
   (a) an upper support body adapted to be disposed above the pipeline;
   (b) support wheels mounted on said support body for rolling engagement with the pipeline as the support body moves longitudinally relative to the pipeline;
   (c) a rotary cutter disposed below said upper support body and the pipeline;
   (d) means for attaching said rotary cutter to said support body for movement longitudinally therewith relative to the pipeline and for rotation about a substantially vertical axis; and
   (e) suction means having an inlet and disposed in the vicinity of said rotary cutter for removing soil from the trench cut by said rotary cutter to thereby enable the pipeline to be lowered into the trench.

2. The structure set forth in claim 1, wherein:
   (a) said upper support body is hollow and has an inlet and an outlet therefrom; and
   (b) said suction means is connected to said inlet of said hollow support body for flowing soil from the cut trench through said body for discharge at soil outlet.

3. The structure set forth in claim 1, wherein said rotary cutter includes:
   (a) an open cage having a plurality of cage frame members;
   (b) a plurality of cutting elements on each of said cage frame members for effecting a cutting of a trench as said cutter rotates; and (c) a fluid-actuated motor for rotating said open cage relative to said support body and the pipeline for the cutting action by the cutting elements.

4. The structure set forth in claim 1, including:
(a) means for driving at least one of said support wheels for moving the apparatus longitudinally relative to the pipeline.

5. The structure set forth in claim 1, wherein said rotary cutter includes:
(a) an open cage having a plurality of spirally disposed cage frame members;
(b) a plurality of cutting elements on each of said cage frame members for effecting a cutting of a trench as said cutter rotates; and
(c) a fluid-actuated motor for rotating said open cage relative to said support body and the pipeline for the cutting action by the cutting elements.

6. The structure set forth in claim 1, wherein said means for attaching said cutter to said body includes:
(a) hinge means for hinging said support body to said rotary cutter;
(b) lock means for releasably locking said support body to said rotary cutter; and
(c) said support body being pivotable about said hinge means when said lock means is released for laterally moving said apparatus to or from the pipeline.

7. The structure set forth in claim 1, including:
(a) a remote power assembly having a suction pump therewith forming part of said suction means; and
(b) a discharge pipe extending from said support body to said suction pump for discharging soil cut by the cutter assembly.

8. The structure set forth in claim 1, wherein said means for attaching said rotary cutter to said support body includes:
(a) a substantially vertically extending rotatable drive shaft mounted on said support body;
(b) means connecting the lower portion of said drive shaft to the lower portion of said rotary cutter for imparting rotation thereto;
(c) a guide ring on the upper portion of said rotary cutter; and
(d) a plurality of guide rollers connected to said support body and engageable with said guide ring for stabilizing the upper portion of said rotary cutter as it is rotated.

9. The structure set forth in claim 8, wherein said suction means includes:
(a) a lower tubular inlet assembly;
(b) said tubular assembly being joined with a pair of upper flow tubes thereabove; and
(c) each of said flow tubes being disposed on opposite sides of the pipeline and having connection with said support body to provide balance and stability while also providing for the flow therethrough of soil as it is cut by said cutter and pumped by said vanes of said suction means.

10. The structure set forth in claim 8, wherein said suction means includes;
(a) a lower tubular inlet assembly;
(b) said tubular assembly being joined with a pair of upper flow tubes thereabove;
(c) each of said flow tubes being disposed on opposite sides of the pipeline and having connection with said support body to provide balance and stability while also providing for the flow therethrough of soil as it is cut by said cutter and pumped by said vanes of said suction means;
(d) one of said tubes being pivotally hinged to said support body; and
(e) the other of said tubes being releasably attached to said support body, whereby the apparatus may be pivoted to an open position about the hinge upon a release of the releasable attachment to permit a relative lateral movement between the pipeline and the apparatus.

References Cited

UNITED STATES PATENTS

| | | | |
|---|---|---|---|
| 2,417,313 | 3/1947 | MacKinnon | 61—72.6 X |
| 2,755,632 | 7/1956 | Hauber et al. | 61—72.4 |
| 3,004,392 | 10/1961 | Symmank | 61—72.4 |
| 3,103,790 | 9/1963 | Popich | 61—72.4 |
| 3,238,734 | 3/1966 | Rhodes | 61—72.4 |
| 3,368,358 | 2/1968 | Elliott | 61—72.4 |

EARL J. WITMER, *Primary Examiner.*